United States Patent [19]

Voles et al.

[11] 3,976,998

[45] Aug. 24, 1976

[54] SYNTHETIC APERTURE RADARS

[75] Inventors: Roger Voles, London; Simon Watts, Esher, both of England

[73] Assignee: EMI Limited, Hayes, England

[22] Filed: June 6, 1974

[21] Appl. No.: 476,996

[30] Foreign Application Priority Data

June 7, 1973 United Kingdom ............... 27263/73

[52] U.S. Cl. ........................... 343/5 CM; 343/5 DP

[51] Int. Cl.[2] ........................................... G01S 9/02

[58] Field of Search ....................... 343/5 DP, 5 CM

[56] References Cited

UNITED STATES PATENTS

| | | | |
|---|---|---|---|
| 3,725,928 | 4/1973 | Klimchak et al. | 343/5 DP |
| 3,766,559 | 10/1973 | Butcher, Jr. et al. | 343/100 SA |
| 3,787,849 | 1/1974 | Sletten et al. | 343/7.7 |
| 3,787,855 | 1/1974 | Cragon et al. | 343/17.1 R |

*Primary Examiner*—T.H. Tubbesing
*Assistant Examiner*—Richard E. Berger
*Attorney, Agent, or Firm*—Fleit & Jacobson

[57] ABSTRACT

There is disclosed a synthetic aperture radar arranged to survey a region from a mobile location. The radar returns received from the region are first phase weighted by a series of predetermined factors. They are then stored and combined with later returns to give an output signal which has a maximum value when any target present in the region is in a predetermined direction from the location.

7 Claims, 5 Drawing Figures

L1 L2 L3 L4 L5 LN
A1 A2 A3 A4 A5 AN-1 AN
RC1 RC2 RC3 RC4 RC5 RC(N-1) RCN
2
$A_i \cos\theta_i$
RS1 RS2 RS3 RS4 RS5 RS(N-1) RSN
1
$A_i \sin\theta_i$ x
(X+1/2βR)
Pi+N
Px
Pn
Pi
(X−1/2βR)
X
0
1/2β
1/2β
T L1
L2
L3
L4
L5
LN
A1
A2
A3
A4
A5
AN-1
AN
RC1
RC2
RC3
RC4
RC5
RC(N-1)
RCN
2
Ai cosθi
RS1
RS2
RS3
RS4
RS5
RS(N-1)
RSN
1
Ai sinθi

SYNTHETIC APERTURE RADARS

The present invention relates to synthetic aperture radars and relates especially though not exclusively to sideways looking radar for an aircraft.

It has been proposed to enhance the resolution of a sideways looking radar for an aircraft by considering the aircraft, as it flies past a target, to sweep across a region in which radar returns are received from the target. The radar returns are phase weighted by a series of predetermined factors and summed so as to stimulate signals received by an aerial having a synthetic aperture of dimensions commensurate with those of the region. The aperture so synthetised may be many times larger than the physical dimensions of the receiving aerial of the radar. The predetermined factors are arranged to weight the phase of the returns by differing amounts, the amounts being dependent upon the particular range cell being investigated. To achieve this end, it has been proposed to firstly store the returns, and then apply them in groups to apparatus for weighting the signals by said predetermined factors.

According to the invention there is provided a processing arrangement, for a synthetic aperture radar, arranged to operate on phase quadrature components of each of a sequence of signals, received by an aerial included in said radar, including a. weighting circuits arranged to weight each of said components by a respective group of factors to provide groups of weighted phase quadrature components for each received signal, b. at least one combining circuit arranged to combine the corresponding phase quadrature components to provide a group of weighted signals for each received signal and, c. a store adapted to store each of the weighted signals of a group, in combination with weighted signals of other such groups, to provide output signals indicative of the position of a target in relation to the said aerial.

In order that the invention may be fully understood and readily carried into effect, it will now be described with reference to the accompanying drawings.

Figure 1:
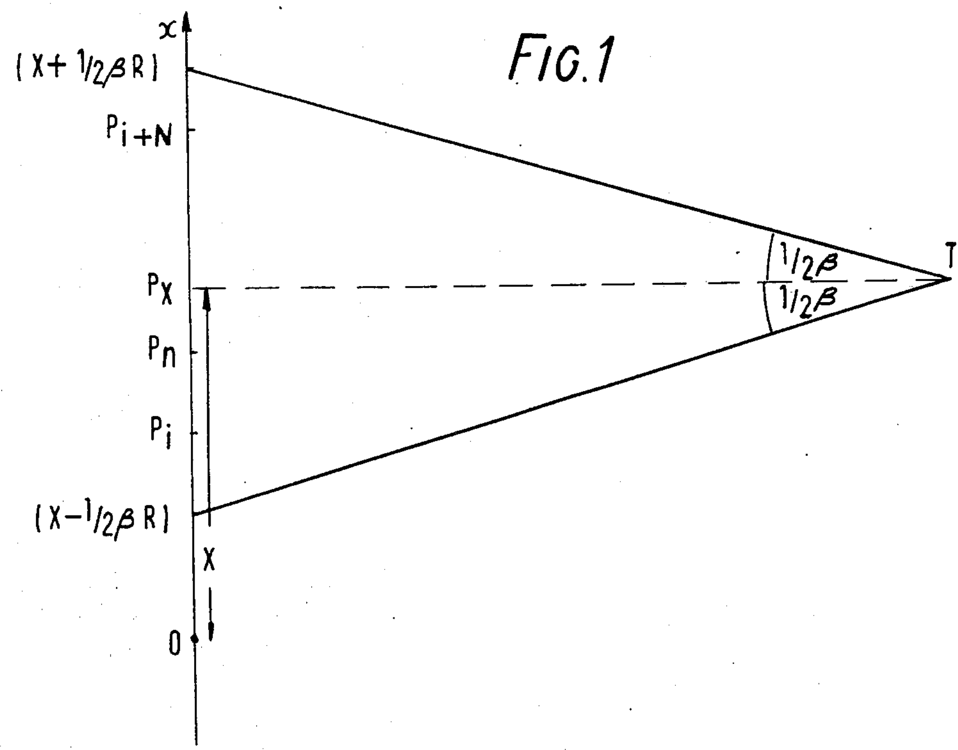
FIG. 1 is a diagram of the coordinate system used to explain the principles of the invention.

Referring now to FIG. 1, a sideways looking radar is installed in an aircraft moving uniformly along a path $Ox$, O being the origin of the coordinate distance $x$ along the path. A point target T is situated to the right of the flight path. The normal from T to the flight path intersects the path at a point P at a distance X from the origin, and if the length of this normal is R, then R is the range of the target.

Considering the radar aerial to be located at a point $P(x)$ along the flight path, and assuming the main lobe of the aerial directivity pattern to be disposed at an angle $\pm\frac{1}{2}\beta$ about the normal to the flight path at P, it will be apparent that the target T will provide radar returns to the aerial over a number of positions P lying within a distance $\beta$ R along the flight path for small values of $\beta$ i.e., for $$(X - \tfrac{1}{2}\beta R) \leq Op(x) \leq (X + \tfrac{1}{2}\beta R) \qquad \text{I}$$

If transmitted waves from the radar have a reference phase $\psi$ then the returned waves have a phase $(\psi - \theta)$ where $\theta$ is a phase dependent on the path traversed by the wave. Thus a returned wave may be represented in relation to amplitude and phase by $$Ae^{j(\psi - \theta)}$$

To provide an output from the radar indicative of signals received from a synthetic aperture, a number of radar returns are sampled at a series of equally spaced aerial positions, of which $P_n$ is typical and which has a corresponding return $$A_n e^{j(\chi - \theta)}$$

The returns are each multiplied by a respective weighting factor $F(x_n)$ arranged to take account of the phase delay attributable to returns on reaching different positions in the synthetic aperture. The weighted returns are then summed over all values of $n$ corresponding to positions $P_i$ to $P_{i+N}$ such that $P_i$ and $P_{i+N}$ are symetrically disposed about the position $P_X$. The weighted sum required is $|S_X|$ where $S_X$ is given by $$S_X = \sum_{n=0}^{N} A_{i+n} F(x_n) e^{j(\psi - \theta_{i+n})}$$

for a particular range cell; the value of $F(x_n)$ varies depending on the range cell to be investigated. The nature of $F(x_n)$ is such that it provides a series of phase weighting factors in antiphase to the phases of returns from a point target traversing to the aperture. Thus the sum $|S_X|$ correlates the radar returns and provides a maximum output when returns from a particular target substantially match the function $F(x_n)$ across the aperture. The amplitude weighting depends on the shape that is required for the response to a point target. The summation range is then effectively shifted along the $x$-axis by one sampling position such that $P_i \rightarrow P_{i+1}$ and the sum is then reformed with the same limits using the same function $F(x_n)$. A series of such sums is provided to produce an output indicative of a synthetic aperture of width $(OP_{i+N} - OP_i)$ moving along the $x$-axis.

It can be shown that $F(x_n)$ may be written as $$F(x_n) = W_n e^{j\phi_n}$$

where $W_n$ is real, and thus the sum $|S_X|$ associated with the point $P_X$ may be written as $$|S_X| = \left| \sum_{n=0}^{N} A_{i+n} W_n e^{j(\theta_{i+n} - \phi_n)} \right| \qquad \text{II}$$

where $OP_X = \frac{1}{2}(OP_{i+N} + OP_i)$

In accordance with one example of the invention the real and imaginary parts of $S_X$ are computed to specify the value thereof, i.e., $$\sum_{n=0}^{N} [A_{i+n} \cos\theta_{i+n} W_n \cos\phi_n + A_{i+n} \sin\theta_{i+n} W_n \sin\phi_n] \qquad \text{III}$$

and $$\sum_{n=0}^{N} [A_{i+n} \sin\theta_{i+n} W_n \cos\phi_n - A_{i+n} \cos\theta_{i+n} W_n \sin\phi_n] \qquad \text{IV}$$

Figure 2:
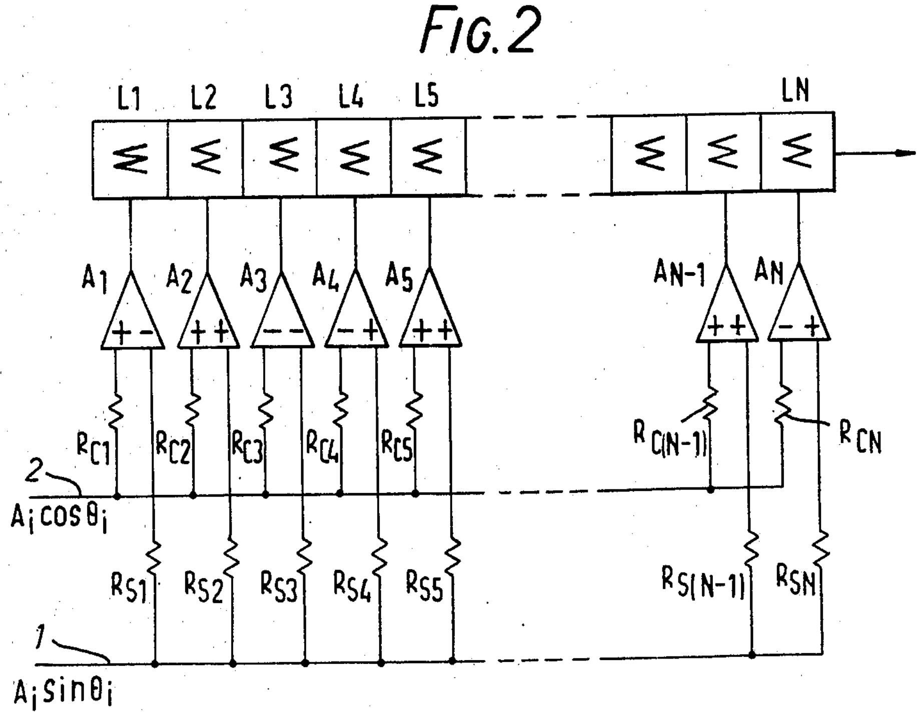
FIG. 2 shows a processing circuit for a radar system according to the present invention.

It can be seen that these summations comprise cos $\theta$ and sin $\theta$ terms multiplied by respective scalar factors. FIG. 2 shows an example of apparatus capable of forming either the real or imaginary part of successive values of $S_X$ for a particular range cell. The example to be described forms the real part of $S_X$. Video signals derived from the radar receiver aerial indicative of successive samples of the aforementioned radar returns are gated for a particular range and are processed to form phase and quadrature signals indicative of $A_i$ cos $O_i$ and $A_i$ sin $O_i$. These signals are applied to lines 1 and 2 respectively. A series of operational amplifiers $A_1$, $A_2$ . . . $A_N$ are connected to lines 1 and 2 via a series of resistance weights $R_C$ and $R_S$ of which $R_{Cl}$, $R_{C2}$ . . . $R_{CN}$ are arranged to weight input signals applied thereto by the factors $|W_1 \cos \phi_1|$, $|W_2 \cos \phi_2|$, . . . $|W_n \cos \phi_N|$ respectively, while $R_{S1}$ . . . $R_{SN}$ are arranged to weight signals by the factors $|W_1 \sin \phi_,|$, $|W_2 \sin \phi_2|$, . . . $|W_n \sin \phi_N|$ respectively. $R_{S1}$ $R_{Cl}$, $R_{S2}$ $R_{C2}$ . . . $R_{CN}$ $R_{SN}$ are respectively connected to amplifiers $A_1$, $A_2$ . . . $A_N$ and to the appropriate inverting or non inverting inputs thereof such that for a particular value of $A_i \cos \theta_i$ and the corresponding value of $A_i \sin \theta_i$, the amplifiers $A_1$ . . . $A_n$ provide outputs ($A_i \sin \theta_i W_1 \sin \phi_1 + A_i \cos \theta_i W_1 \cos \phi_1$) . . . ($A_i \sin O_i W_N \sin \phi_N + A_i \cos O_i W_N \cos \phi_N$) respectively.

The outputs of the amplifiers are connected to respective stages of a device, each of whose contents may be shifted to the next adjacent stage, and each stage indicated by $\epsilon$, being capable of summing an amplifier input to its existing stored contents. The contents of each stage of the device are shifted on each time a new sample value of $A_i \cos \theta_i$ and $A_i \sin \theta_i$ are applied to the lines 1 and 2. When an initial value of stage $L_1$ of the device has been shifted through a series of stages to the stage $L_N$, it will be apparent that the summation of the real part of a particular value of $S_X$ is achieved, and successive values formed in stage $L_N$ are indicative of successive values of the real part of $S_X$ for successive sample positions $P_X$.

A similar circuit (not shown) is provided in which the values of the resistive weights $R_{C1}$ $R_{S1}$ . . . $R_{CN}$ $R_{SN}$ are arranged to compute the corresponding values of the imaginary parts of the successive values of $S_X$, and the outputs of the two circuits are squared and added to provide signals indicative of successive values of $|S_X|^2$. A series of such pairs of circuits may be connected in parallel to provide parallel outputs indicative of the summation for different range cells.

Figure 3:
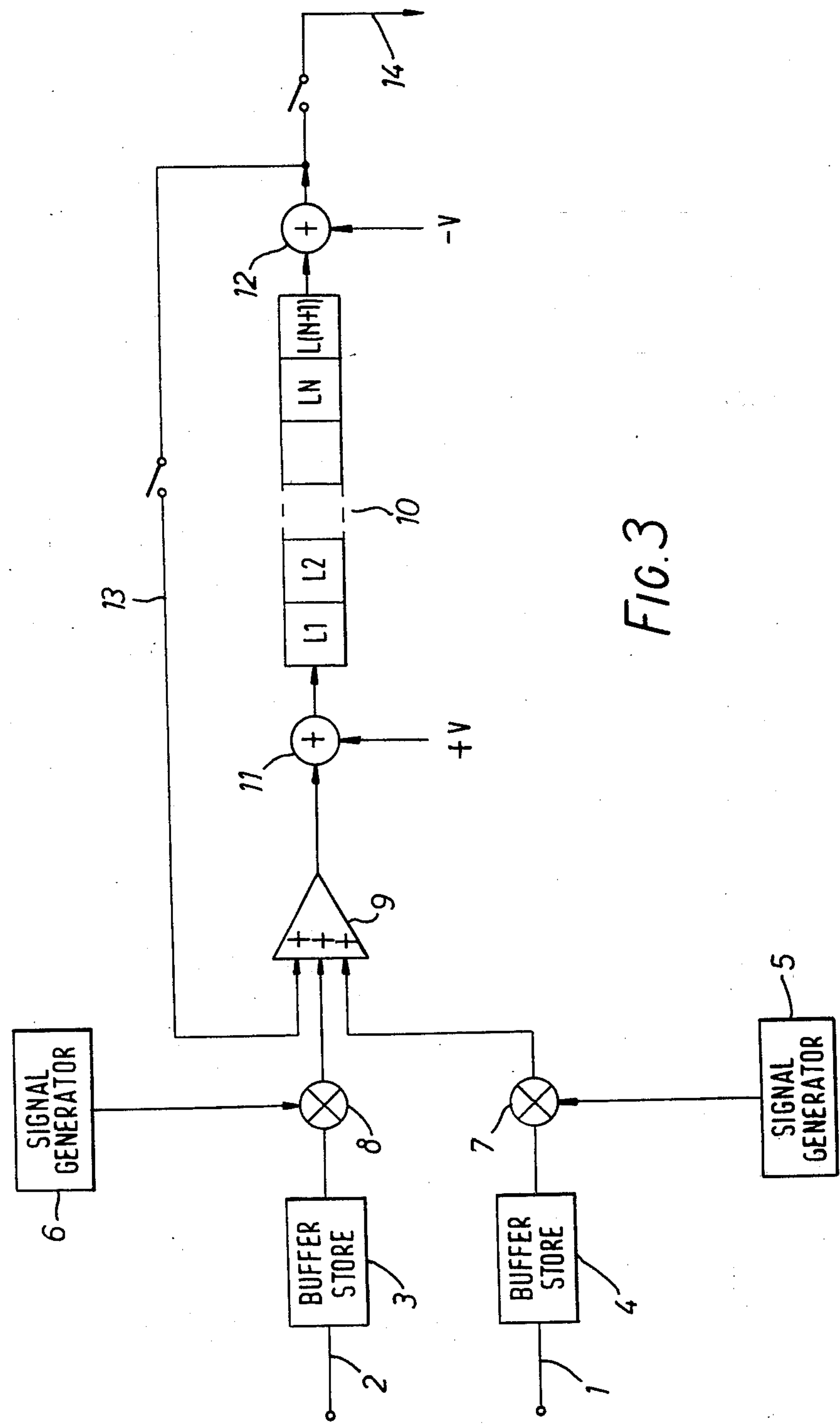
FIGS. 3, 4 and 5 show other examples of a processing circuit for a radar system according to the invention.

FIG. 3 shows a practical example of apparatus for computing either the real or imaginary part of $S_X$. Signals indicative of successive samples of $A_i \cos \theta_i$ and $A_i \sin \theta_1$ are applied to lines 1 and 2 as described before, and are held in buffer stores 3 and 4 between successive input signals such that they are multiplied by signals from generators 5 and 6 in multipliers 7 and 8 respectively. The signal generator 5 is arranged to produce a sequence of signals indicative of $W_1 \sin \phi$ . . . $W_N \sin \phi_N$ while generator 6 is arranged to produce a sequence of signals indicative of $W_1 \cos \phi_1$ . . . $W_N \cos \phi_N$. Thus for each value of $\theta_i$, a chain of signals indicative of $A_i \cos \theta_i W_1 \cos \phi_1$ . . . $A_i \cos \theta_1 W_N \cos \phi_N$ is applied to one input of amplifier 9 while another chain of signals indicative of $A_i \sin \theta_i W_1 \sin \phi_i$ . . . $A_i \sin \theta_i W_N \sin \phi_N$ is applied to another input thereof. The output of the amplifier thus comprises a chain of signals indicative of ($A_i \cos \theta_i W_1 \cos \phi_1 + A_i \sin \theta_i W_1 \sin \phi_1$)

$$. . . (A_i \cos \theta_i W_N \cos \phi_N + A_i \sin \theta_i W_N \sin \phi_N) \qquad V$$

which is applied sequentially to a device 10 that operates as an analogue shift register and which may comprise a charge transfer device each of its stages L1 – L(N+1) being capable of storing on signal of the chain of signals from the amplifier. A bias signal is added to the input signals to the device 10 in adder 11 and is subtracted at adder 12 such that positive and negative values may be stored in the stages of device 10. A feedback loop 13 is arranged to apply the output of the device 10 to another summing input of amplifier 9.

Figure 4:
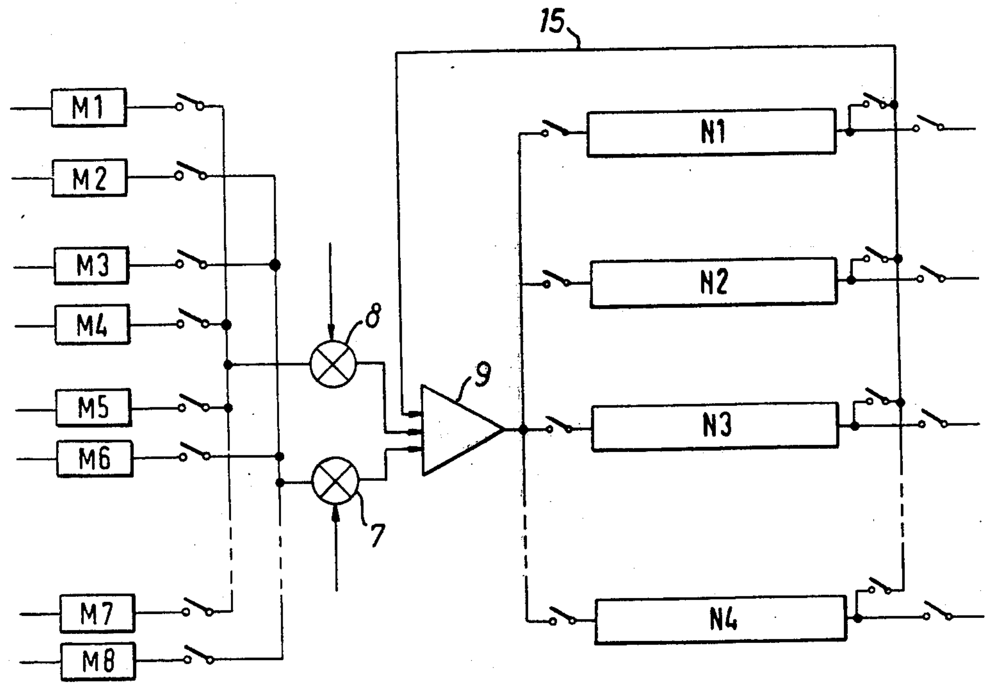

In operation, for a first pair of sample signals applied to lines 1 and 2, the device 10 is clocked so that stages $L_1$ to $L_N$ contain respective ones of the chain of signals shown in the expression V. When the next pair of sample signals are applied to lines 1 and 2 (i.e. $A_{i+1} \sin \theta_{i+1}$, $A_{i+1} \cos \theta_{i+1}$), the signal chain is clocked at the rate of multiplication of the generators 5 and 6 such that a first signal indicative of ($A_{i+1} \cos \theta_{i+1} W_1 \cos \phi_1 \theta_{Ai+1} \sin \theta_{i+1} W_1 {}_{sin} \phi_1$) is read into position $L_1$, the signals of expressions V being shifted to positions $L_2$–$L_{(N+1)}$. The contents of stage $L_{(N+1)}$ is then applied via the feedback loop 13 to be summed to the next output of the multipliers 7 and 8, the resultant being stored in stage $L_1$ after the next of the contents of device 10 have been clocked forward one stage. The process is repeated until all the outputs of the multipliers are added into the device 10. The final signal of the sequence corresponding to expression V, for each pair of sample signals, is output on line 14 instead of being recirculated. Further samples are applied to lines 1 and 2, and it will be apparent that the initial contents of stage $L_1$, will move forward by one stage after each sample signal pair is applied to lines 1 and 2, and has contributions successively added thereto until after N samples, the outut formed in the last stage $L_{(N+1)}$, at the end of each sequence of expression V, is indicative of the real part of $S_X$. As subsequent samples are applied to the apparatus, further outputs are successively formed in this last stage, each indicative of a successive value of the real part of $S_X$ and are provided as an output on line 14. Another similar circuit is required to compute the imaginary component of $S_X$, the real and imaginary parts being squared and added to provide signals indicative of $|S_X|^2$. It will be apparent that similar circuits will be required for each range cell to be investigated. In practice, as many as 6000 range cells may be required to be processed indicating a requirement for 6000 circuits of the type shown in FIG. 3. However, the sets of weighting factors may be such that they do not vary significantly between adjacent range cells, and thus groups of range cells may be processed by one processing circuit, such a processing circuit is shown in FIG. 4 which is capable of processing a series of range cells of which only four are shown. The two quadrature returns from the received signal are sampled with respect to time and hence with respect to range cell, and the quadrature signals for each range cell are applied to respective pairs of buffer stores M1–M8. Each buffer store pair such as M1 and M2 is arranged to apply its phase and quadrature components to respective multipliers 8 and 7 which multiply inputs thereto by a series of weighting factors suitable for the group of range cells to be processed. The multiplier outputs are summed in amplifier 9 and are stored in a shift register N1. The process is then repeated for the other range cells such that each of the registers N1–N4 stores weighted signals for a particular range cell. When a further set of inputs are applied to the buffer stores M1–M8, then the contents of each of the registers N1–N4 is applied to the feedback loop 15 in turn as the corresponding range cell buffer contents are applied to the multipliers 7 and 8, thereby achieving the summation $S_X$ for each range cell in turn in the manner described with reference to FIG. 3. If the circuit shown in FIG. 4 is to process ten range cells, it will be apparent that the multipliers must operate ten times faster than required for the operation of the circuit shown in FIG. 3, the registers N1–N4 being clocked in turn at the same rate as the multipliers 7 and 8.

Figure 5:
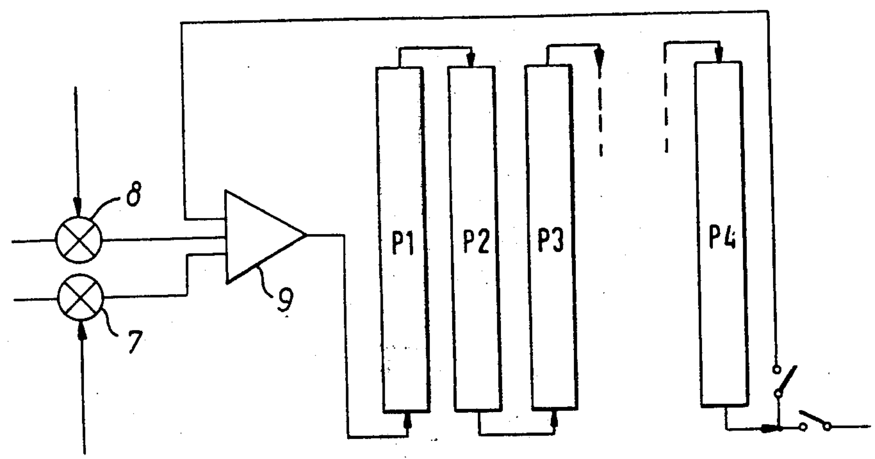

FIG. 5 shows another store arrangement suitable for use with the apparatus shown in FIG. 4 in which the multipliers may be clocked at a slower rate. Each of the range cell signals from the buffers M1–M8 are clocked in turn for each pair of weighting functions set at the multipliers, the weighted returns being stored in a series of shift registers P1–P4, the process being repeated for each successive sample point $P_i$. Thus, the successive values of output of the register chain are indicative of a map of the region.

The circuits described with reference to FIGS. 2, 3, 4 and 5 may be constructed to process digital radar signals, and ordinary digital arithmetic processors and shift registers may be used in the processing circuits for this invention. In this specification the words store or storing are not necessarily intended to imply that information entered into a store can later be retrieved in an identical manner or form.

What we claim is:

1. A processing arrangement, for a synthetic aperture radar, arranged to operate on phase quadrature components of each of a sequence of signals, received by an aerial included in said radar, including a. a shifting storage device having a plurality of inputs to which signals are applied for addition to signals input at earlier stages thereof before being shifted to later stages thereof to provide an output signal at a final stage, and b. weighting circuits arranged to weight each of said components by respective factors to provide different weighted components of each received signal to each of said inputs at substantially the same time, the weighting factors being such that, in response to successive received signals from said aerial, the said output signal is indicative of the position of a target in relation to said aerial.

2. A processing arrangement, for a synthetic aperture radar, arranged to operate on phase quadrature components of each of a sequence of signals, received by an aerial included in said radar, including a. a shifting storage device, capable of storing $(n_+1)$ signals in sequence, having an input from which stored signals are shifted progressively to an output, b. means for selecting every $n^{th}$ stored signal appearing at said output to provide an output signal, c. a recirculating path arranged to provide the remaining $(n-1)$ stored signals in sequence to the input of said device, d. weighting circuits arranged to weight each of said components by a sequence of factors to provide a sequence of $n$ different weighted components of each received signal for application to the said input of said device and e. means for combining each of said weighted components, with recirculated signals appearing at the appropriate time, before application to the said input, wherein the weighting factors are chosen such that, in response to successive received signals from said aerial, the said output signal is indicative of the position of a target in relation to said aerial.

3. A processing arrangement according to claim 2 wherein said storage device is at least one analogue shift register.

4. A processing arrangement according to claim 3 wherein said at least one analogue shift register is at least one charge transfer device.

5. A processing arrangement according to claim 3 further including at least one adder arranged to add a predetermined bias signal to each of said weighted signals and at least one adder arranged to subtract said bias signal from each of said weighted signals.

6. A processing arrangement according to claim 2 wherein said weighting circuits include at least one signal generator and at least one multiplier cooperating with said at last one signal generator.

7. A processing arrangement according to claim 2 wherein said weighting circuits include a plurality of operational amplifiers.

* * * * *